(12) United States Patent
Billerbeck

(10) Patent No.: US 10,627,948 B2
(45) Date of Patent: Apr. 21, 2020

(54) SEQUENTIAL TWO-HANDED TOUCH TYPING ON A MOBILE DEVICE

(71) Applicant: Microsoft Technology Licensing, LLC, Redmond, WA (US)

(72) Inventor: Bodo von Billerbeck, Victoria (AU)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 15/164,595

(22) Filed: May 25, 2016

(65) Prior Publication Data

US 2017/0344170 A1 Nov. 30, 2017

(51) Int. Cl.
| | |
|---|---|
| G06F 17/00 | (2019.01) |
| G06F 3/041 | (2006.01) |
| G06F 3/042 | (2006.01) |
| G06F 3/01 | (2006.01) |
| G06F 3/0488 | (2013.01) |
| H04M 1/725 | (2006.01) |

(52) U.S. Cl.
CPC .......... *G06F 3/0416* (2013.01); *G06F 3/017* (2013.01); *G06F 3/0418* (2013.01); *G06F 3/0426* (2013.01); *G06F 3/04886* (2013.01); *H04M 1/72583* (2013.01)

(58) Field of Classification Search
CPC .................................................. G06F 3/04886
See application file for complete search history.

(56) References Cited

U.S. PATENT DOCUMENTS

| | | | |
|---|---|---|---|
| 7,042,442 B1 * | 5/2006 | Kanevsky | G06F 3/017 |
| | | | 345/157 |
| 8,838,085 B2 | 9/2014 | Forutanpour et al. | |
| 9,001,068 B2 | 4/2015 | Westerman et al. | |
| 9,195,321 B2 | 11/2015 | Laubach | |
| 9,215,302 B2 | 12/2015 | Thorson et al. | |
| 9,239,648 B2 | 1/2016 | Smus | |
| 2010/0103127 A1 | 4/2010 | Park et al. | |
| 2010/0134423 A1 | 6/2010 | Brisebois et al. | |
| 2010/0302155 A1 | 12/2010 | Sands et al. | |
| 2010/0310136 A1 | 12/2010 | Tsuda | |
| 2011/0050576 A1 | 3/2011 | Forutanpour et al. | |
| 2012/0133589 A1 | 5/2012 | Marsden et al. | |

(Continued)

OTHER PUBLICATIONS

PCT International Search Report and Written Opinion in PCT/US2017/033203, dated Aug. 21, 2017, 15 pages.

(Continued)

*Primary Examiner* — Howard Cortes
*Assistant Examiner* — Barbara M Level

(57) ABSTRACT

Examples of the present disclosure describe systems and methods of providing sequential two-handed touch typing. In aspects, a client device may provide a touch-based input receiving application. The client device may include one or more sensors operable to detect the approach of a user's hand or touch-based tool. In response to a detection, the client device may determine input interaction information, such as aspects of the hand (e.g., right or left) and/or finger(s) being used. The input interaction information may be used to detect candidate keys and to provide a keyboard (or a portion of a keyboard) based thereon. In aspects, the provided keyboard or keyboard portion may be altered in response to a subsequent detection.

20 Claims, 9 Drawing Sheets

(56) References Cited

U.S. PATENT DOCUMENTS

| | | | |
|---|---|---|---|
| 2012/0260207 A1* | 10/2012 | Treskunov | G06F 3/04886 715/773 |
| 2013/0019192 A1 | 1/2013 | Itoh et al. | |
| 2013/0222247 A1 | 8/2013 | Liu et al. | |
| 2014/0015757 A1* | 1/2014 | Li | G06F 3/038 345/168 |
| 2014/0139429 A1* | 5/2014 | Menadeva | G06F 3/017 345/156 |
| 2014/0267044 A1 | 9/2014 | Andersen | |
| 2014/0365949 A1* | 12/2014 | Xia | G06F 17/276 715/780 |
| 2015/0143276 A1 | 5/2015 | Luo | |
| 2015/0234581 A1 | 8/2015 | Terrero et al. | |
| 2015/0324116 A1 | 11/2015 | Marsden et al. | |
| 2016/0209928 A1* | 7/2016 | Kandur Raja | G06F 3/017 |
| 2016/0253044 A1* | 9/2016 | Katz | G06F 3/017 345/156 |
| 2016/0370991 A1* | 12/2016 | Itzhaik | G06F 3/04886 |

OTHER PUBLICATIONS

Goel, et al., "GripSense: Using Built-In Sensors to Detect Hand Posture and Pressure on Commodity Mobile Phones", In Proceedings of the 25th annual ACM symposium on User interface software and technology, Oct. 7, 2012, pp. 545-554.

\* cited by examiner

SEQUENTIAL TWO-HANDED TOUCH TYPING ON A MOBILE DEVICE

BACKGROUND

In today's computing environment, several devices are configured to receive touch-based input. Generally, such devices receive touch input from a user (e.g., a finger or thumb) or a touch input tool (e.g., a stylus) via a computer screen or similar display area. On mobile devices, the display screens provide a limited input and viewing area, such that users are often confined to providing input using a single finger and/or one or more thumbs. As a result, the touch-based input process is reduced substantially compared to entering input using a full-sized keyboard.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of providing sequential two-handed touch typing. In aspects, a client device may provide a touch-based input receiving application. The client device may include one or more sensors operable to detect the approach of a user's hand or touch-based tool. In response to a detection, the client device may determine input interaction information, such as aspects of the hand (e.g., whether it is a right or left hand, orientation, etc.) and/or finger(s) being used. The input interaction information may be used to detect candidate keys and to provide a keyboard (or a portion of a keyboard) based thereon. In aspects, the provided keyboard or keyboard portion may be altered in response to a subsequent detection.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
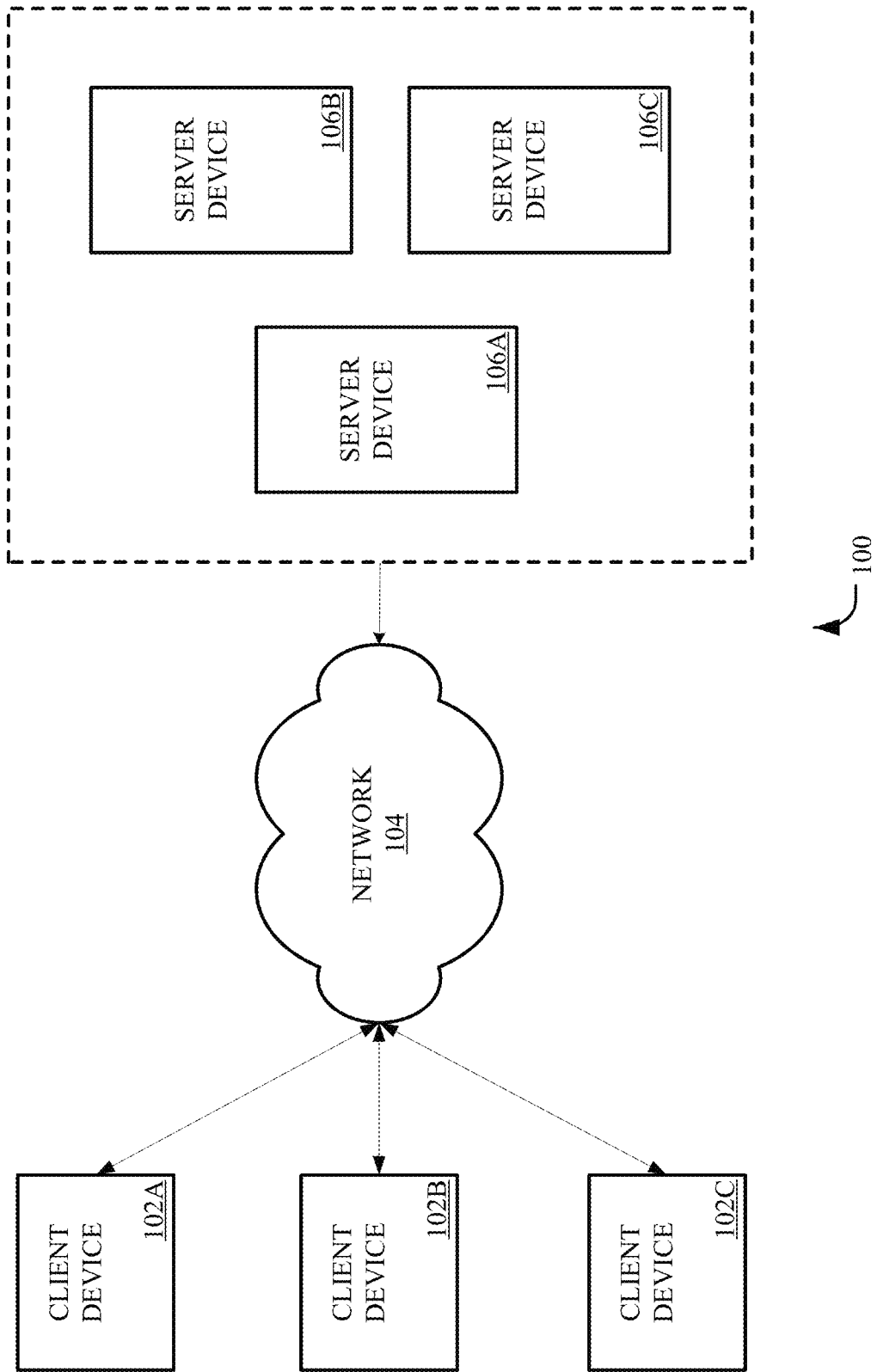
FIG. 1 illustrates an overview of an example system for providing sequential two-handed touch typing as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of providing sequential two-handed touch typing. In aspects, a client device including one or more sensors may provide a touch-based input receiving application or service. Examples of sensors may include a proximity sensor, an accelerometer sensor, a gyroscopic sensor, a force sensor, an acoustic sensor, a touchscreen sensor, an optical sensor, and a localization sensor. In examples, the sensors may be operable to detect an object approaching the client device or a display portion of the client device. The object may be a user, a portion of a user, a touch-based tool, and image or a soundwave. The client device may use the sensor data of the detected object to determine input interaction information. Input interaction information, as used herein, may refer to data representing one or more aspects of the object's interaction with a sensor, a display portion of a client device or the client device. The input interaction information may be used to determine input options (such as input mode, keyboard layout, candidate keyboard keys, etc.). The determined input option may be represented via an interface of the client device.

In aspects, input may be received via the interface based on the determined input option. The input may be provided to a predictive language model. A model, as used herein, may refer to a statistical language model that may be used to determine a probability distribution over one or more word and/or character sequences and/or to predict a response value from one or more predictors. In examples, a model may be a rule-based model, a machine-learned regressor, a machine-learned classifier, or the like. The model may be used to predict a word or a next letter in a sequence of characters received by the client device. Additionally, the model may be used to predict one or more input options.

Accordingly, the present disclosure provides a plurality of technical benefits including but not limited to: increasing the rate of touch-based input entry; expanding the application of touch-based typing, increasing the effective size of mobile device display screens; detecting approaching input implements; determining aspects of input implements; presenting input-dependent input modes; training language understanding models; improving user experience; and improving efficiency and quality for applications/services utilizing examples of the present disclosure, among other examples.

FIG. 1 illustrates an overview of an example system for providing sequential two-handed touch typing as described herein. Exemplary system 100 presented is a combination of interdependent components that interact to form an integrated whole for personalizing natural language systems. Components of the systems may be hardware components or software implemented on and/or executed by hardware components of the systems. In examples, system 100 may include any of hardware components (e.g., the sensors described above, components used to execute/run an operating system (OS), etc.), and software components (e.g., applications, application programming interfaces (APIs), modules, virtual machines, runtime libraries, etc.) running on hardware. In one example, an exemplary system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the exemplary operating environments depicted in FIGS. 5-8. In other examples, the components of systems disclosed herein may be spread across multiple devices. For instance, input may be entered on a client device and information may be processed or accessed from other devices in a network, such as one or more server devices.

As one example, the system 100 comprises client device 102A, client device 102B, client device 102C, distributed network 104, and a distributed server environment comprising one or more servers such as server device 106A, server device 106B and server device 106C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client device 102A may be configured to include one or more sensors. The sensors may be operable to detect objects that are approaching or interacting with client device 102A. The sensor data collected from the sensors may be used to determine input interaction information associated with the object and/or client device. The input interaction information may be used to determine input options to be presented via an interface of client device 102A. Client devices 102B and 102C may be similarly configured to client device 102A, but may be a different device type from client device 102A. For example, client device 102A may be a mobile phone, client device 102B may be a tablet, and client device 102C may be a personal digital assistant (PDA). In some aspects, information (e.g., sensor data, input interaction information, input options, etc.) received and/or determined by client device 102A may be accessible to client devices 102B and 102C. For example, sensor data collected by client device 102A may be analyzed by client device 102B to determine input interaction information. Client device 102C may then use the input interaction information to determine input options. The input options may be presented on one or more of client devices 102A-C. Client devices 102A-C may further be configured to receive input via a user interface component associated with the input options or other input means. Examples of input may include voice, visual, touch and text input. The received input may also be stored in a data store. Client device 102A-C may transmit the received input to a server device, such as server device 106A, via distributed network 104.

Server devices 106A-C may be configured to receive and process input from one or more client devices, such as client devices 102A-C. In aspects, server devices 106A-C may expose or otherwise provide an interface (e.g., API, user interface, service, etc.) to client devices. Server devices 106A-C may collect data from client devices 102A-C using the interface. The data may be stored in a data store accessible to server devices 106A-C, used to generate a result, and/or used to provide content to client devices 102A-C. In some aspects, server devices 106A-C may include logic, a rule set and/or data for determining (or for facilitating the determination by client devices 102A-C of) one or more of sensor data, input interaction information, input options.

Figure 2:
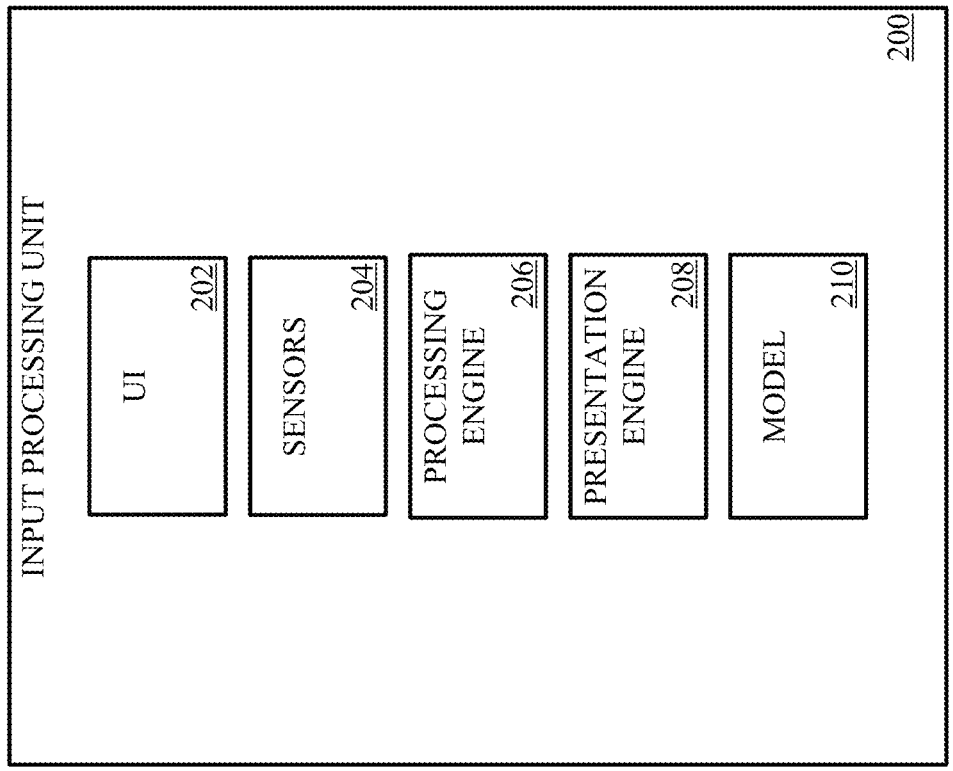
FIG. 2 illustrates an exemplary input processing unit for providing sequential two-handed touch typing as described herein.

FIG. 2 illustrates an overview of an exemplary input processing unit 200 for providing sequential two-handed touch typing, as described herein. The sequential two-handed touch typing techniques implemented by input processing unit 200 may comprise the sequential two-handed touch typing techniques and input described in FIG. 1. In alternative examples, a single system (comprising one or more components such as processor and/or memory) may perform processing described in systems 100 and 200, respectively.

With respect to FIG. 2, input processing unit 200 may comprise UI 202, sensors 204, processing engine 206, presentation engine 208 and model 210. UI 202 may be configured to provide an interface for receiving input and presenting information to one or more users. For example, UI 202 may provide access to an application or service that provides for receiving various forms of input from one or more sources, such as sensors 204. Sensors 204 may be configured to detect one or more characteristics of an object or event. In aspects, sensors 204 may detect the physical characteristics of objects and/or the motion of objects relative to at least a portion of input processing unit 200. For example, a mobile phone comprising a word processing application may include a plurality of sensors, such as a proximity sensor, an antenna and a camera. The sensors, alone or in combination, may detect an object approaching the input area of the mobile phone. For instance, the proximity sensor may detect that a hand is approaching the input area based on the signal strength recorded for the hand over one or more time intervals. The proximity sensor may be used in conjunction with the antenna to detect which hand (e.g., the right or left) and fingers are approaching the input area based on a 3D image of the mobile phone's surroundings. Similarly, the camera may be used in conjunction with proximity sensor and/or antenna to detect (with a high degree of certainty) which hand (e.g., the right or left) and fingers are approaching (or moving away from) the input area of the mobile phone based on one or more 2D or 3D images visible to the camera.

Processing engine 206 may be configured to process sensor data. In aspects, processing engine 206 may receive sensor data from sensors 204. Processing engine 206 may parse the sensor data to determine whether the sensor data recorded for each sensor corresponds to the same object (e.g., a right hand) and/or event (e.g., movement of a right hand towards a display area). The determination may be made by comparing, for example, timestamps, signal strengths and/or coordinate data recorded for the object by each sensor. When the sensor data is determined to correspond to the same object or event, processing engine 206 may determine input interaction information. The input interaction information may be determined using pattern-matching techniques, image recognition, sound wave analysis, a rule set, fuzzy logic, machine-learned models and/or one or more weighting algorithms. For example, one or more images in the sensor data may be provided to an image recognition engine. The image recognition engine may correlate the sensor data images to known or probable actions. For instance, the image recognition engine may correlate an image of an approaching left hand having an extended index finger with pressing the 'f' key on a keyboard. In at least one example, the correlation may include comparing a sensor data image (e.g., hand trajectory, finger angle, finger curl, etc.) with one or more labeled images in a data store. The correlation may also include determining a label for the sensor data image using one or more of the comparison data and the received input. In another instance, the correlation may include providing one or more sensor data images as input to a motion image classifier. The motion image classifier may sequentially arrange the sensor data images to recreate or otherwise predict, for example, a keyboard key press.

As another example, one or more sound waves in the sensor data may be provided to a sound wave recognition engine. The sound wave recognition engine may correlate the sensor data sound waves to known or probable actions. For instance, the sound wave recognition engine may use a sound wave classifier to determine that one or more sound waves correspond to a particular a finger touching the display area of input processing unit 200. In at least one example, the sound wave classifier may also determine that a sound wave corresponds to a particular area of the display area (e.g., a home row key press, a top row key press, etc.). Based on such determinations, the sound wave recognition engine may generate or access a probability distribution of finger usage. The sensor data sound waves may be compared to the probability distribution of finger usage to infer which finger was used and/or which of the candidate keys was the intended target. As another example, one or more images in the sensor data may be provided to a text inference engine. The text inference engine may use previously determined keys and/or phrases to correlate sensor data images to probable user intent. For instance, in light of the 'q' key previously being pressed, the text inference engine may correlate an approaching right hand having an extended index finger with pressing the 'u' key on a keyboard (instead of the 'j' key).

Presentation engine 208 may be configured to determine input modes. In aspects, presentation engine 208 may receive input interaction information from processing engine 206. Presentation engine 208 may use the received input interaction information determine one or more input modes associated with input processing unit 200 and/or UI 202. For example, presentation engine 208 may determine that an intent to press the 'f' key on a keyboard corresponds to the left side of a keyboard. As a result, presentation engine 208 may generate and/or present an interactive onscreen keyboard representing the left half of a keyboard via UI 202. In examples, the keyboard generated and/or presented by presentation engine 208 may represent an entire keyboard or portions of a keyboard (e.g., a half of the keyboard, a number pad, functional keys, etc.). Additionally, presentation engine 208 may display the keyboard with alternate layouts (e.g., QWERTY, HCESAR, etc.) and in alternate formats (e.g., traditional, multimedia-based, ergonomic, etc.). In at least one example, the keyboard may be presented as an overlay that swoops from, for example, a side of the display area when a corresponding portion of the keyboard (e.g., the left or right side) is determined using the input interaction information. In another example, portions of a keyboard visible in UI 202 may be enlarged based on an intent in the input interaction information to select a corresponding portion of the keyboard. In yet another example, presentation engine 208 may not present a keyboard. Instead, input may be entered directly into UI 202 based on the input interaction information.

Model 210 may be configured to predict user input. In aspects, model 210 may be trained to predict/infer user input, identify objects and/or classify objects using sensor data, input interaction information, and/or previous user input. For example, sensor data for a particular finger sequence may be received by input processing unit 200. Candidate keys may be generated using the finger sequence, as described above. The candidate keys may be provided as input to model 210. Model 210 may analyze the candidate keys for each entry (e.g., image, video, proximity signal, sound wave, etc.) in the finger sequence. Based on the analyzed candidate keys, model 210 may provide as output one or more potential word and/or sentence candidates using, for example, n-gram likelihood techniques or other predictive analysis techniques. In at least one example, the word and/or sentence candidates may be used by an autocomplete, spell-check and/or grammar utility. Model 210 may present the candidates via UI 202. Model 210 may further be configured to facilitate input mode selection. In some aspects, model 210 may provide key, word and/or sentence candidates to other components of input processing unit 200. For example, model 210 may provide word candidates to presentation engine 208. Based on the word candidates, presentation engine 208 may determine a probable sequence of input modes to display. The probable input modes may then be cached or otherwise preloaded on input processing unit 200 to decrease processing time and increase user experience during user input.

Figure 3:
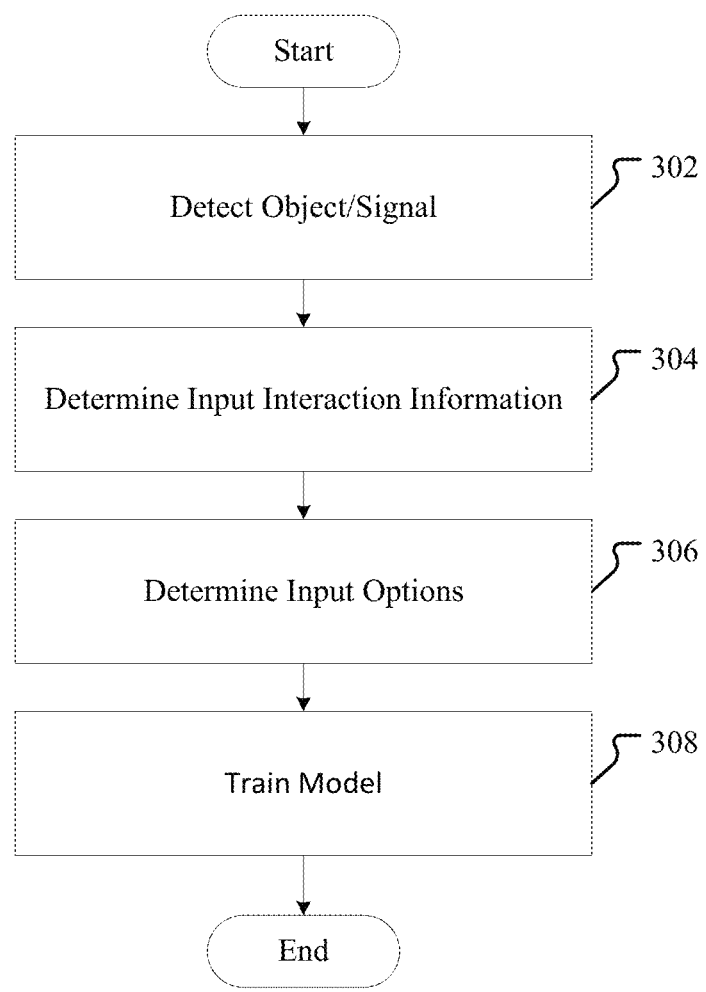
FIG. 3 illustrates an example method of determining good and bad abandonment using gesture movement as described herein.

FIG. 3 illustrates an example method of providing sequential two-handed touch typing as described herein. In aspects, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed on an application or service for providing the storage and/or manipulation of user input. In at least one example, method 300 may be executed (e.g., computer-implemented operations) by one or more components of a distributed network, such as a web service/distributed network service (e.g. cloud service).

Exemplary method 300 begins at operation 302 where an object may be detected by a computing device, such as input processing unit 200. In aspects, the client device may include sensors, such as sensors 204. One or more of the sensors may detect the movement of one or more objects about the client device. For example, a mobile phone may include at least two sensors, a proximity sensor and a camera. The proximity sensor may detect the approach of an object based on a varying signal strength for the object over a period of time. For instance, the proximity sensor may emit an electromagnetic field through which the object passes. Based upon one or more reductions in the return signal, the proximity sensor may determine that the object is approaching the sensor (and, thereby, the mobile phone). During the proximity sensor detection, the camera may also detect the object based on visual data acquired by an image sensor. For instance, the camera may capture image data of an object approaching a display area from the left side of the mobile phone. In some aspects, the input processing unit 200 may record and/or collect the sensor data and store the sensor data in one or more data stores.

At operation 304, input interaction information may be determined. In aspects, the sensor data may be received by a processing component, such as processing engine 206. The processing component may parse the sensor data to order and/or group the sensor data into one or more events. In examples, an event may correspond to a time period or user session and the detection of one or more objects by one or more sensors. The parsed data may be used to determine input interaction information for the event. For example, the processing component may compare (or cause to be compared) one or more portions of the sensor data to a labeled data set. The comparison may include the use of one or more models accessible to the processing component, such as an image recognition model, an image motion recognition model, a sound wave recognition model, a display screen capacitance model, etc. In at least one example, the comparison may include providing the captured image data as input to a model that is operable to search the data store images for an image matching (or relatively matching) an image in the captured image data. When a match is detected, the image in the captured image data may be assigned or otherwise associated with the label of the matching data store image. The associated label may then be used to identify an object in the captured image data. For instance, an image in the captured image data may correspond to a data store image labeled "Left hand with index finger extended." As a result, the object in the captured image data may be identified as a left hand. In some aspects, the data store images may additionally comprise or be associated with context data. For example, the data store may include the same (or similar) images of hands corresponding to contexts, such as typing actions, sign language actions, etc. In such an example, the object in the captured image data may additionally be associated with the "typing" context and accordingly identified as pressing a corresponding keyboard key (e.g., a keyboard key reachable by the left index finger).

At operation 306, input options may be determined. In aspects, the input interaction information may be received by a presentation component, such as presentation engine 208. The presentation component may use the input interaction information to determine one or more input modes, layouts and/or formats. In example, the presentation component may parse captured image data and/or input interaction information to identify and/or determine a label or identifier corresponding to an image. Based at least on the label or identifier, the presentation component may generate or select a corresponding input mode. For example, the presentation component may parse captured image data to identify an object labeled "Left hand with index finger extended" and assigned a "typing" context. Based on the typing context, a keyboard may be selected from a list of input modes accessible to input processing unit 200. Further, based on the label, a layout comprising the left half of a keyboard may be selected. In some aspects, the selected input mode and layout may be displayed on the client device via an interface, such as UI 202. In one example, the input mode may be presented as an overlay image that swoops in from an edge of the interface or display area. In another example, the input mode may be visible on the interface and may be enlarged based on the input interaction information. For instance, a keyboard may be visible on the interface of a mobile phone. Based on the detection of a left hand with an extended index finger by the mobile phone, the presentation component may enlarge the left half of the keyboard or the candidate keys available to the index finger. In at least one example, the candidate keys may be enlarged to reflect the approximate size of keyboard keys on a standard computer keyboard.

At operation 308, a model may be trained. In aspects, the computing device may have access to one or more predictive models, such as model 210. In at least one aspect, the predictive model may be one of the models described above with respect to operation 304. In examples, the model may receive as input (and thereby be trained using) at least one of sensor data, input interaction information and input options. The received input may train the model to correlate objects and user intents and/or to determine or infer words, sentences and input mode options. For example, a model may receive sensor data corresponding to a user input received via an input option. Based upon a user acceptance of the input, the model may generate or determine a correlation between the sensor data and the user input. The model may then use the correlation to identify subsequently received sensor data. For instance, sensor data may include an image that corresponds to a left hand with an extended index finger. This image may result in capturing user input corresponding to the 'f' key on a keyboard. After the input has been approved by the user (e.g., the 'f' is not modified by the user, the user continues to enter input, etc.), the model may receive as input the image (e.g., the left hand) and the input (e.g., 'f'). The model may generate a correlation between the image and the input such that the model associates subsequently received images that match (or substantially match) the image with 'f' character. In some examples, an image classifier or image recognition techniques may be used to determine whether images match (or substantially match).

Figure 4:
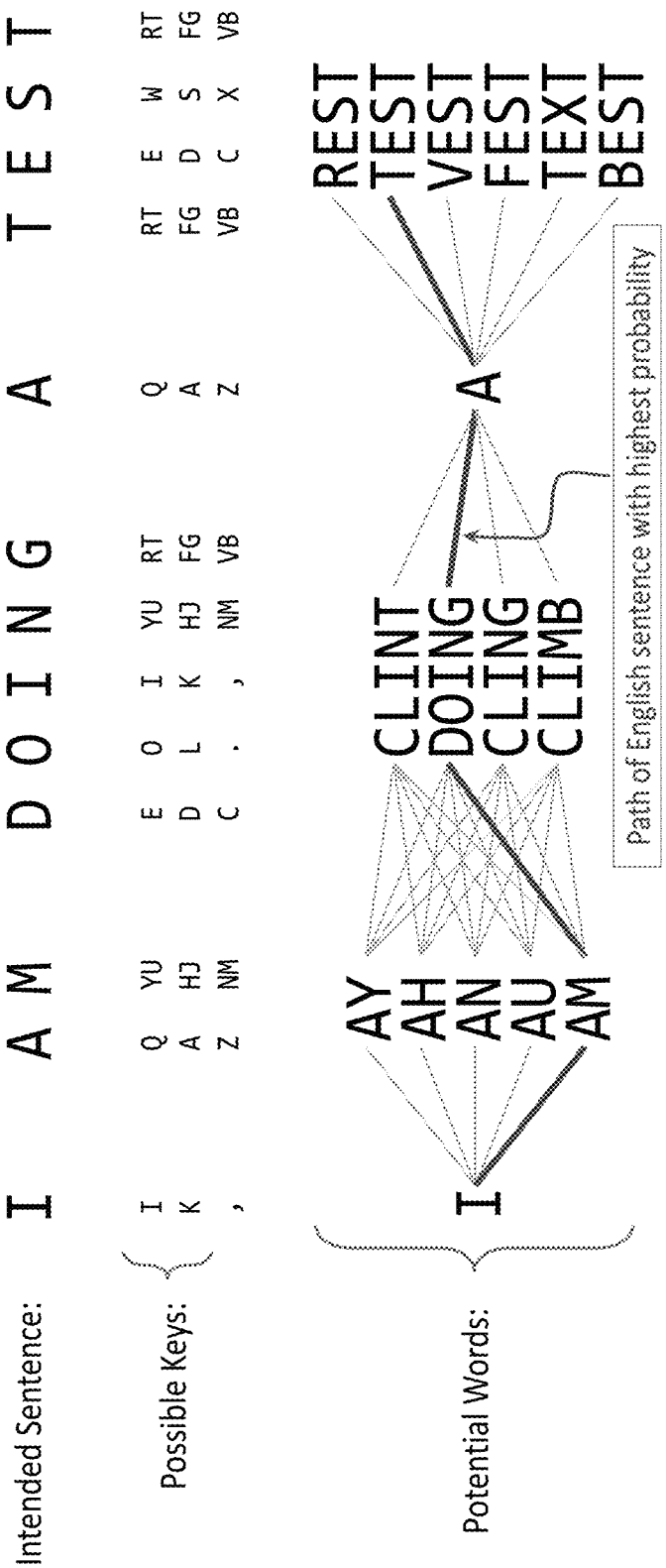
FIG. 4 is a diagram illustrating an exemplary determination of a most-probable sentence using a plurality of candidate keys as described herein.

In another example, a model may receive user input via one or more input options. The model may use the received user input to predict or determine candidate keys, words and/or sentences. For instance, a model may receive or have access to user input representing a portion of a word. The model may determine one or more candidate words from the input using predictive techniques, such as n-gram modeling, natural language classifiers, decision trees, k-nearest neighbor algorithms, support vector machines, etc. The candidate words may be presented via a user interface and/or provided to, for example, a word processing utility (e.g., auto-complete, spell-check, grammar, etc.). In another instance, a model may receive or have access to user input representing a portion of a sentence. The model may access the associated input interaction information to infer an intended sentence from the input using one or more of the predictive techniques described above. In a particular example, the inferred sentence may correspond to the sentence with the highest probability of representing the user intent, as illustrated in FIG. 4.

In yet another example, a model receiving user input via one or more input options may use the received user input to predict or determine one or more user input modes. For example, a model may receive the user input "chris." The model may determine that the finger sequence for the word "chris" corresponds to key presses on the left side of the keyboard for the first, third and fifth letters of the word, and key presses on the right side of the keyboard for the second and fourth letters of the word. As a result, the model may determine (or cause one of the components of the computing device to determine) that the input options (e.g., keyboard halves) for the word "chris" should be displayed in a sequential order (e.g., left-right-left-right-left). Based on this determination, the presentation component may cache and/or preload the input option sequence. In at least one example, the model may detect and cache frequently used words or contacts. In such an example, when it is determined that a frequently used word will be (or is currently being) entered, the cached input option sequence may be accessed to reduce the processing time and resources needed by the computing device.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
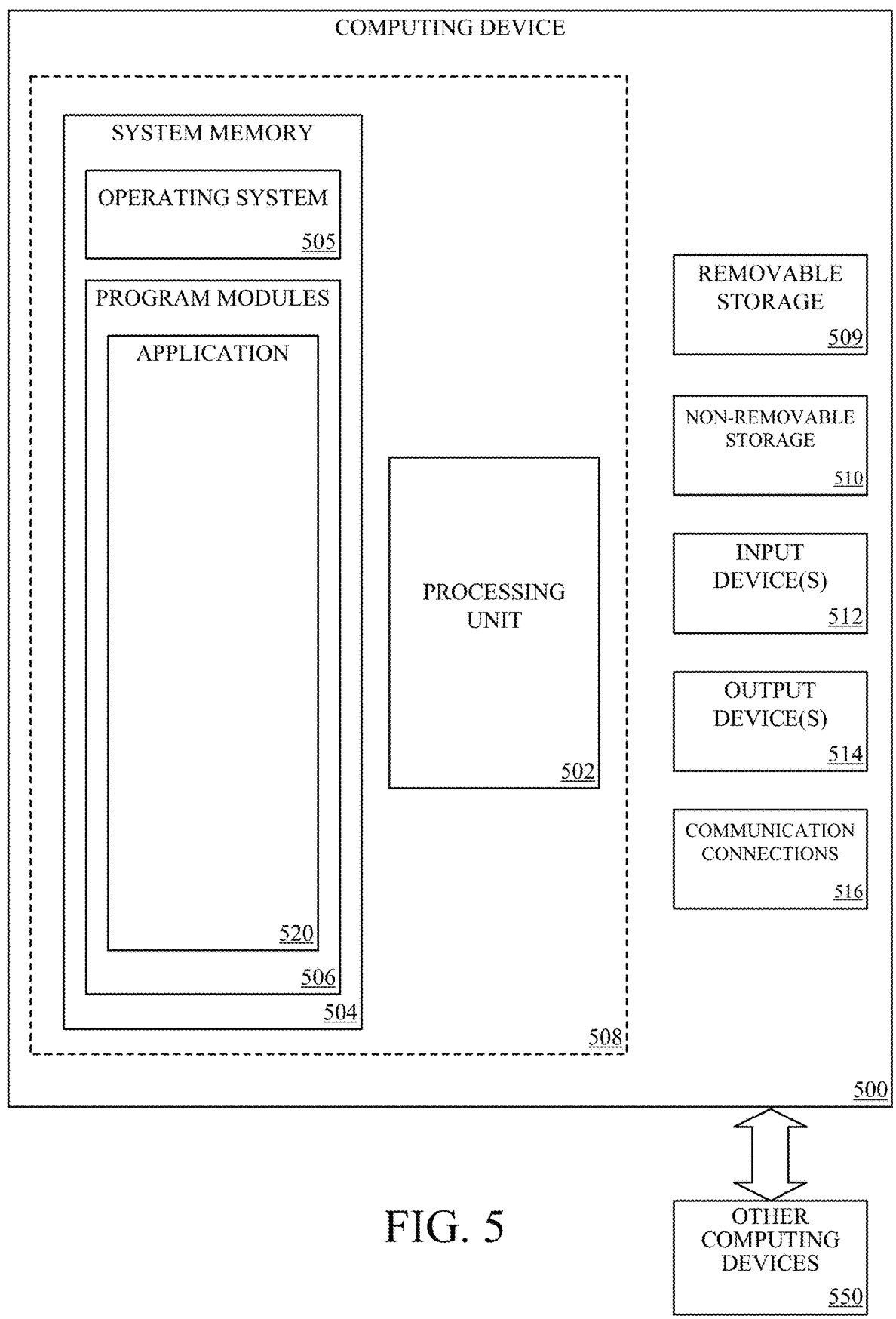
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including the client computing devices 102A-C and the server computing devices 106A-C. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software application 520, such as one or more components supported by the systems described herein. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
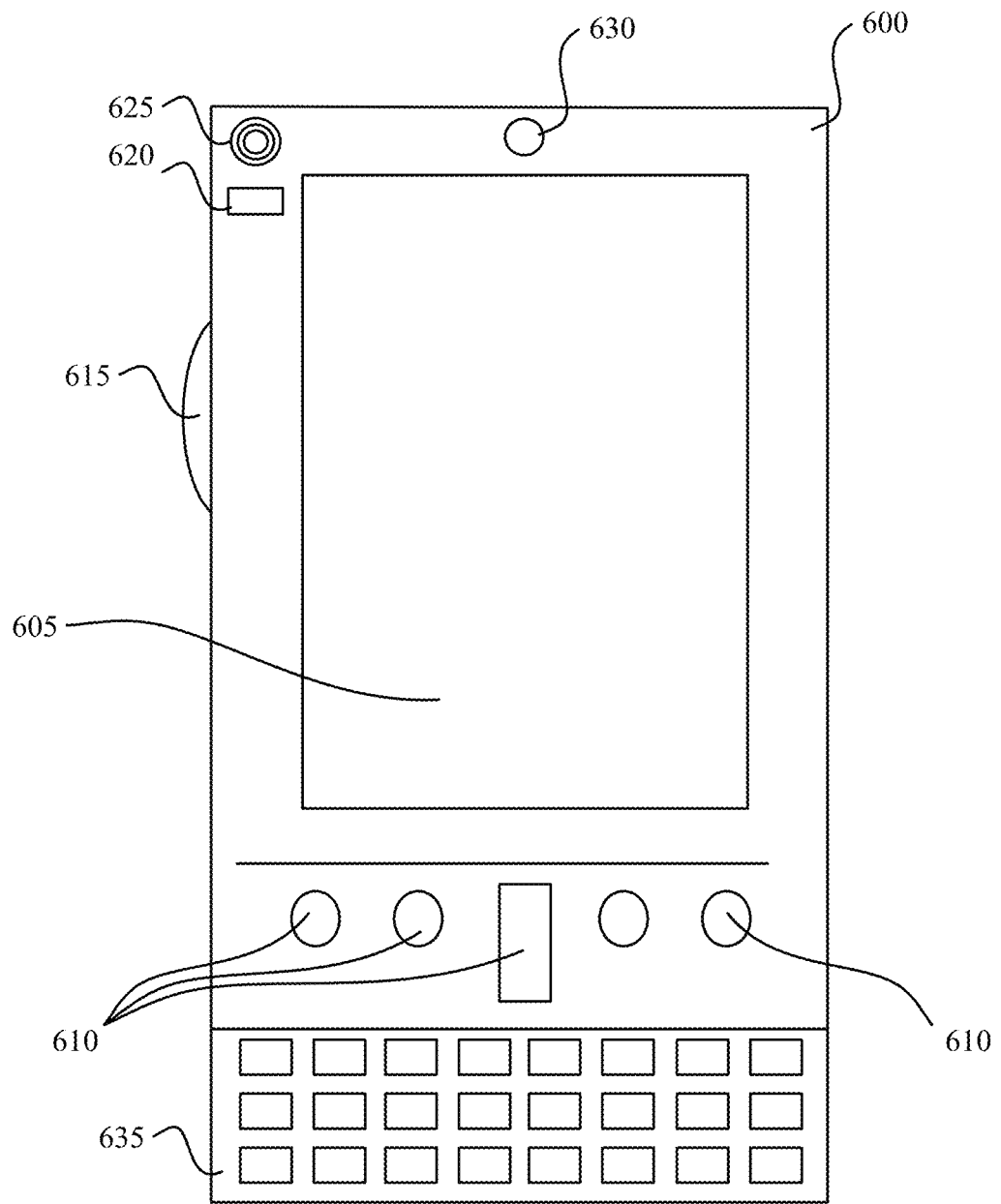
FIGS. 6A and 6B are simplified block diagrams of a mobile computing device with which aspects of the present disclosure may be practiced.
Figure 6B:
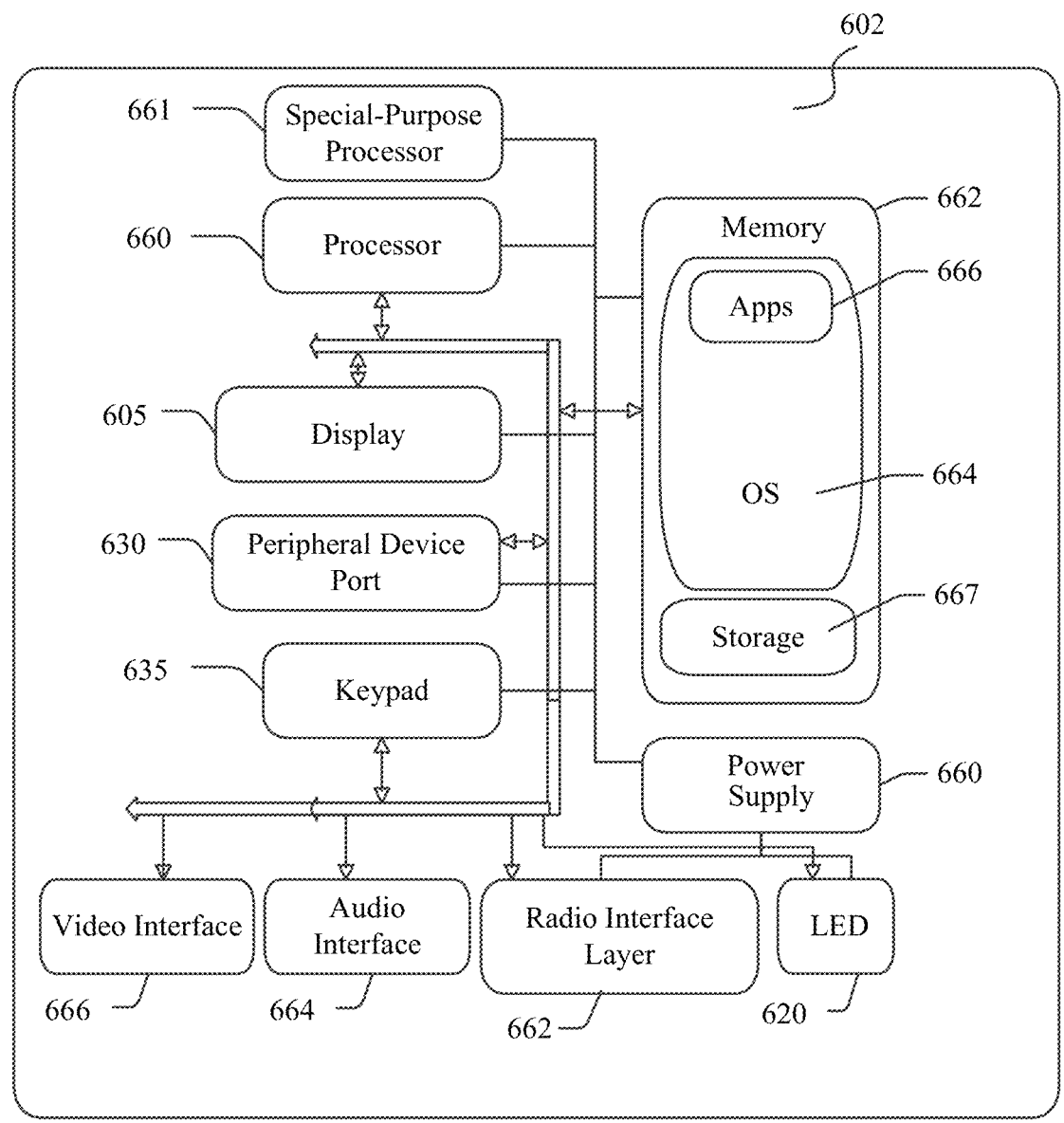

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
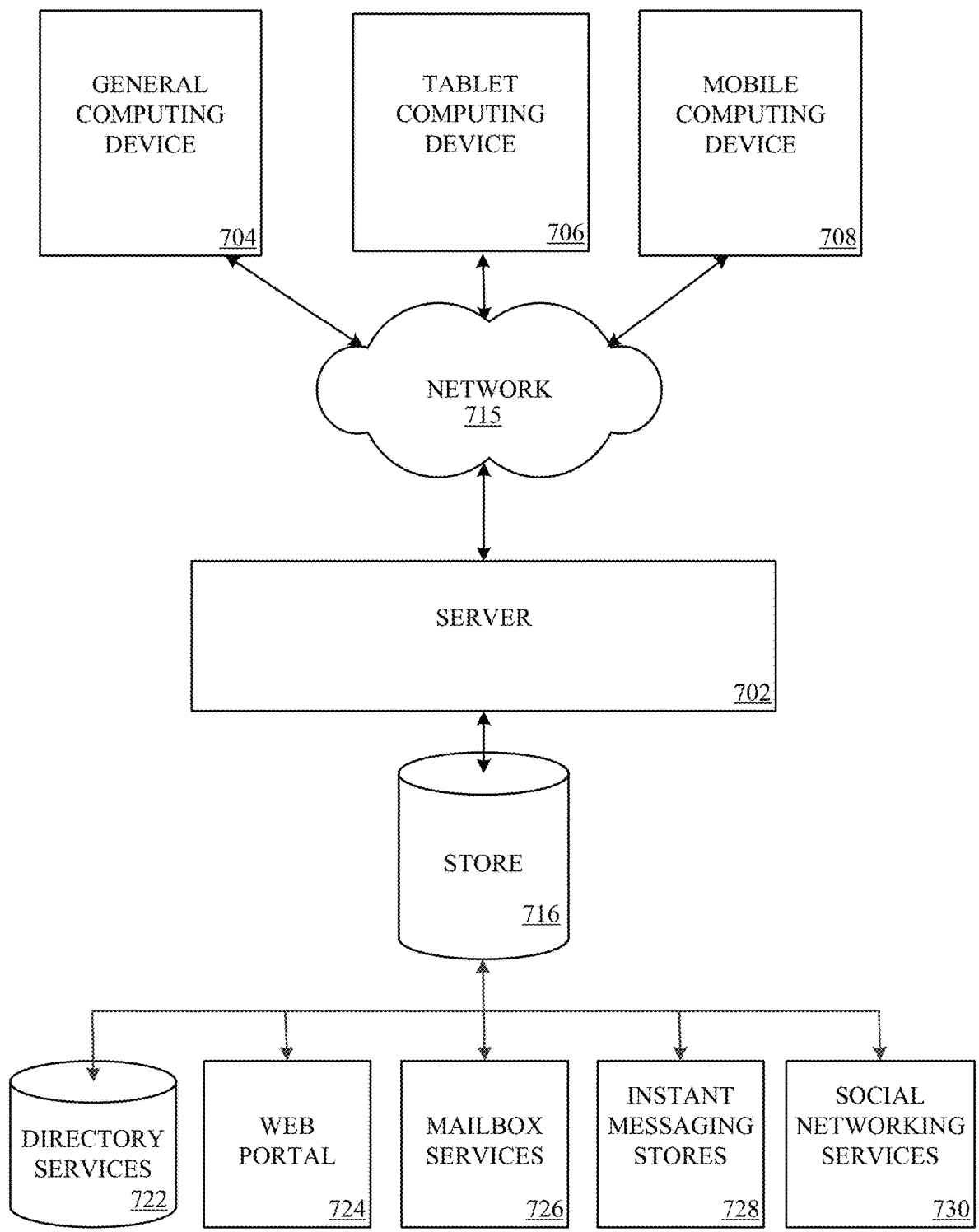
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
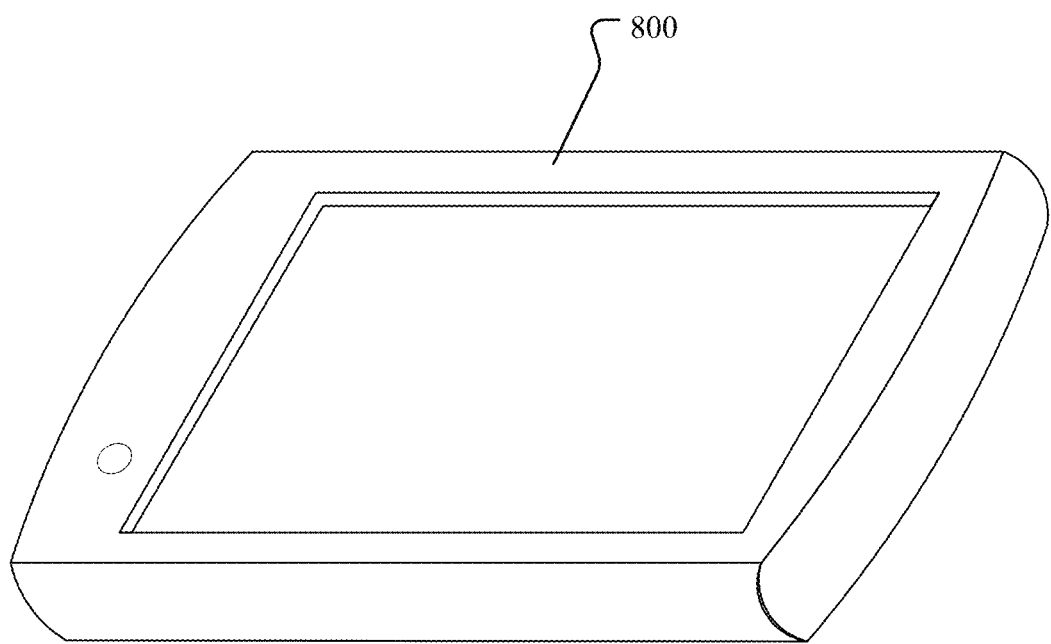
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method for providing sequential two-handed touch typing, the method comprising:
      receiving input into a touchscreen of a mobile device, wherein receiving the input comprises generating an image of an object providing at least a portion of the input, the object comprising at least a portion of a hand, and wherein the touchscreen does not provide a keyboard while receiving the input;
      determining, by the mobile device, input interaction information for the input by comparing the image to a set of labeled images corresponding to input actions, wherein the comparing is performed using a machine learning model for image recognition;
      when a match is found between the image and a first input action in the set of labeled images, correlating the image to the first input action;
      presenting output associated with the first input action via the touchscreen of the mobile device; and
      training a model using at least the input interaction information.

2. The system of claim 1, wherein the first object is associated with a typing action.

3. The system of claim 1, wherein the one or more sensors comprise at least one of: a proximity sensor, an accelerometer sensor, a gyroscopic sensor, a force sensor, an acoustic sensor, a touchscreen sensor, an optical sensor and a localization sensor.

4. The system of claim 1, wherein the sensor data comprises one or more images of at least a portion of a user's hand or arm.

5. The system of claim 1, wherein the input interaction information corresponds to at least one of physical characteristics of the first object and motion data for the first object.

6. The system of claim 1, wherein determining the input interaction information includes using at least one of: pattern-matching techniques, image recognition, sound wave analysis, a rule set, fuzzy logic, machine-learned models and/or one or more weighting algorithms.

7. The system of claim 1, wherein the input interaction information comprises a label, the label describing a physical characteristic of the first object.

8. The system of claim 1, the method further comprising:
   determining input options using the input interaction information, wherein the input options include one or more portions of a keyboard.

9. The system of claim 8, wherein a left side of the keyboard is displayed when the input interaction information indicates the first object is approaching from the left of an interface, and a right side of the keyboard is displayed when the input interaction information indicates the second object is approaching from the right of the interface.

10. The system of claim 1, wherein the model is operable to correlate the first object to one or more user intents.

11. The system of claim 1, the method further comprising:
receiving user input via the touchscreen;
providing the user input as input to the model; and
receiving output from the model.

12. The system of claim 11, the user input is incomplete, and wherein the model is operable to use the incomplete user input to determine at least one of a character, a complete word and a sentence.

13. A method for providing sequential two-handed touch typing, the method comprising:
receiving input into the touchscreen of a mobile device, wherein receiving the input comprises generating an image of an object providing at least a portion of the input, the object comprising at least a portion of a hand, and wherein the touchscreen does not provide a keyboard while receiving the input;
determining, by the mobile device, input interaction information for the input by comparing the image of the object to a set of labeled images corresponding to input actions, wherein the comparing is performed using a machine learning model for image recognition;
when a match is found between the image and a first input action in the set of labeled images, correlating the image to the first input action;
presenting output associated with the first input action via the touchscreen of the mobile device; and
training a model using at least the input interaction information.

14. The method of claim 13, wherein the input comprises one or more sound waves corresponding to a finger contacting a display area.

15. The method of claim 13, wherein the input interaction information comprises a context, the context describing one or more action categories.

16. The method of claim 13, further comprising:
determining an input option using the input interaction information, wherein the input option includes one or more portions of an onscreen keyboard.

17. The method of claim 16, wherein the onscreen keyboard is presented as an overlay on an interface, and wherein the overlay swoops in from a side of the interface.

18. The method of claim 13, wherein training the model comprises providing the sensor data to the model to correlate the sensor data to at least input interaction information.

19. The method of claim 13, further comprising:
receiving user input via the touchscreen;
providing the user input as input to the model; and
receiving output from the model, wherein the output correlates the user input to one or more user intents.

20. A computer-readable media not consisting of a propagated data signal, the computer-readable media storing computer executable instructions that when executed cause a computing system to perform a method providing sequential two-handed touch typing, the method comprising:
receiving first input into a touchscreen of a mobile device, wherein receiving the input comprises generating an image of an object providing at least a portion of the input, the object comprising at least a portion of a hand, and wherein the touchscreen does not provide a keyboard while receiving the input;
determining, by the mobile device, input interaction information based on the first input by comparing the image to a set of labeled images corresponding to input actions, wherein the comparing is performed using a machine learning model for image recognition;
when a match is found between the image and a first input action in the set of labeled images, correlating the image to the first input action;
presenting output via the touchscreen of the mobile device; and
using the input interaction information to train a predictive model.

* * * * *